United States Patent
Schäfer

(10) Patent No.: US 12,024,247 B2
(45) Date of Patent: Jul. 2, 2024

(54) METHOD FOR DETERMINING A GEAR RACK FORCE OF A STEER-BY-WIRE STEERING SYSTEM, STEER-BY-WIRE STEERING SYSTEM AND VEHICLE

(71) Applicant: Volkswagen Aktiengesellschaft, Wolfsburg (DE)

(72) Inventor: Johannes Maria Schäfer, Werben OT Berge (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 435 days.

(21) Appl. No.: 17/274,310

(22) PCT Filed: Sep. 5, 2019

(86) PCT No.: PCT/EP2019/073728
§ 371 (c)(1),
(2) Date: Mar. 8, 2021

(87) PCT Pub. No.: WO2020/053069
PCT Pub. Date: Mar. 19, 2020

(65) Prior Publication Data
US 2022/0048563 A1     Feb. 17, 2022

(30) Foreign Application Priority Data
Sep. 12, 2018   (DE) .......................... 102018215555.0

(51) Int. Cl.
*B62D 5/04*        (2006.01)
*B62D 3/12*        (2006.01)
(Continued)

(52) U.S. Cl.
CPC ............. *B62D 6/008* (2013.01); *B62D 3/126* (2013.01); *B62D 5/0481* (2013.01)

(58) Field of Classification Search
None
See application file for complete search history.

(56) References Cited

U.S. PATENT DOCUMENTS

| 6,892,848 B2 | 5/2005 | Kaltenbach et al. |
| 2006/0086560 A1* | 4/2006 | Furusho .............. B62D 5/0463 180/446 |
| 2007/0131476 A1 | 6/2007 | Kubokawa et al. |

FOREIGN PATENT DOCUMENTS

| DE | 19920975 A1 | 4/2000 |
| DE | 102008021848 A1 | 11/2009 |

(Continued)

OTHER PUBLICATIONS

PCT/EP2019/073728. International Search Report. (Jan. 8, 2020).

*Primary Examiner* — Jonathan M Dager
*Assistant Examiner* — Laura E Linhardt
(74) *Attorney, Agent, or Firm* — Peter Zura; LOZA & LOZA, LLP

(57) ABSTRACT

Technologies and techniques for determining a gear rack force of a steer-by-wire steering system that includes a steering handle, for specifying a steering angle as a function of a steering handle position. A vehicle wheel actuator is configured to set the steering angle by movement of a gear rack of the steering system, by applying an actuating force, the gear rack being coupled to at least one vehicle wheel. A reaction force actuator may produce a reaction force on the steering handle in accordance with a gear rack force. Friction operation is determined, in which gear rack movement does not occur when the steering handle position is changed, and, if friction operation is present, the gear rack force is determined on the basis of the actuating force of the vehicle wheel actuator.

20 Claims, 1 Drawing Sheet

(51) Int. Cl.
*B62D 5/00* (2006.01)
*B62D 6/00* (2006.01)

(56) References Cited

FOREIGN PATENT DOCUMENTS

| | | |
|---|---|---|
| DE | 102014201952 A1 | 9/2014 |
| DE | 102014211815 A1 | 12/2015 |
| WO | 2009133534 A2 | 11/2009 |

* cited by examiner

METHOD FOR DETERMINING A GEAR RACK FORCE OF A STEER-BY-WIRE STEERING SYSTEM, STEER-BY-WIRE STEERING SYSTEM AND VEHICLE

RELATED APPLICATIONS

The present application claims priority to International Pat. App. No. PCT/EP2019/073728 to Johannes Maria Schafer, filed Sep. 5, 2019, titled "Method for Determining a Gear Rack Force of a Steer-By-Wire Steering System, Steer-By-Wire Steering System and Vehicle", which claims priority to German Pat. App. No. 10 2018 215 555.0, filed Sep. 12, 2018, the contents of each being incorporated by reference in their entirety herein.

FIELD OF TECHNOLOGY

The present disclosure relates to technologies and techniques for determining a gear rack force in a steer-by-wire steering system, a steer-by-wire steering system, and a vehicle.

BACKGROUND

Steer-by-wire steering systems are typically characterized in that an input shaft connected to a steering element no longer has mechanical linkages, for example, a gear rack coupled to the vehicle wheels, that implement the steering movement. As a result, the tactile feedback on the steering from the street to the steering element is lost. It is therefore known to use an actuator (e.g., an electric motor) for generating a reaction force or a corresponding feedback torque, which generates a counter-torque and counter force on the steering element based on, among other things, a (vehicle wheel) steering angle. The steering angle is normally determined on the basis of a gear rack position. The reaction force actuator is also often used to output a position specification to move the gear rack according to the provisions of a steering element actuation and thus adjust the steering angle of at least one vehicle wheel.

To be able to give the driver realistic feedback regarding the current driving, or steering, situation, it is also known to determine a gear rack force, based on which the reaction force can be set on the steering element. In principle, this can take place by measuring the gear rack force. To reduce costs, it is preferred that the gear rack force is determined, e.g., using a model and based on other, less complicated measurable signals, e.g. the vehicle's speed or the position of the steering element. Additionally or alternatively, a gear rack movement and/or a yaw rate or lateral acceleration can be detected.

It has been shown to be the case that the gear rack force cannot always be adequately determined and a realistic reaction force generated on the basis thereof. This is due to frictional effects within the steering system that are difficult to take into account.

The detection of manual steering torques in various states of movement, and in particular during initial movement from a neutral position, and to determine a static frictional value therefrom, is known from WO 2009/133 534 A2.

DE 10 2008 021 848 A1 discloses a method and a system for taking the static and dynamic friction in a steering system into account, for which a speed-dependent frictional model is created.

DE 199 20 975 A1 discloses the estimation of and compensation for the static friction in a steering system by evaluating, e.g., a steering torque detection value.

Accordingly, an object of the present disclosure is to improve the generation of realistic reaction forces for a steer-by-wire steering element.

SUMMARY

In various examples, a steer-by-wire steering system and associated vehicle are disclosed herein. It should be understood that the features specified in the disclosure can also be used individually or in various combinations in the presently claimed solution.

It has been determined according to the present disclosure that one problem with generating a realistic reaction force arises when the gear rack is unable to move due to internal system friction (e.g. within the gearing comprising the gear rack) in the actual gear rack forces. In this case, it has so far been difficult to provide the driver with a realistic feedback with sufficient precision by setting an appropriate reaction force.

In some examples detailed below, a state may be detected, in which a gear rack movement is defined, e.g., by moving the steering element, but is not yet implemented. In this state, an actuation force may be exerted by the vehicle wheel actuator on the gear rack in accordance with expectations, in accordance with the movement of the steering element, which does not, however, result in a movement of the gear rack, due to internal friction. This force, which in this state corresponds to a gear rack force, can be used, however, for setting a realistic reaction force. Control signals or other variables, e.g., for generating the actuation force, can be used here, from which the actuation force that is exerted can be determined.

It should be understood that the present disclosure relates primarily to generating a reaction force while the vehicle is actually being operated, and in particular when steering and driving the vehicle. In other words, the present disclosure is not intended for operation in test or laboratory conditions, or at least not limited thereto.

In some examples, a method is disclosed for determining a gear rack force in a steer-by-wire steering system in a vehicle, such as a motor vehicle or passenger automobile. The steering system includes, but is not limited to:
 a steering element (such as a steering wheel), by means of which a (vehicle wheel) steering angle can be specified as a function of a steering element position;
 a vehicle wheel actuator (such as a power electronics system and/or a servomotor), which is configured to set the steering angle by moving a gear rack in the steering system coupled to at least one vehicle wheel when an actuation force is exerted thereon;
 a reaction force actuator (such as an electric motor), with which a reaction force can be generated on the steering element in accordance with a gear rack force;
and wherein the method includes:
 determining a friction-burdened operation (such as a static or internal friction-burdened operation), in which the gear rack does not move when the steering element is moved;
and when in the friction-burdened operation:
 determining the gear rack force based on the actuation force of the vehicle actuator.

The steering element may be mechanically separated from the gear rack, at least with regard to the transfer of torque. Depending on the position of the steering element (or a change therein), however, preferably electronic/digital control signals can be generated for the vehicle wheel actuator, which acts on the gear rack.

The vehicle wheel actuator can be configured in general to apply a torque, for example, by means of a servomotor contained therein, wherein this torque can act in the manner of an actuating force on the gear rack (e.g., as a result of a gear ratio in a transmission and/or by means of a mechanical linkage between the servomotor and the gear rack).

The gear rack force is preferably not measured directly, for example, using sensors interacting, at least indirectly, with the gear rack. By way of example, strain gauges can be used on tie rods coupled to the gear rack, and a difference in the respective measurement results can be obtained to determine the gear rack force. The gear rack force may be determined or calculated indirectly, e.g., using other variables for the steering system. This configuration relates to the normal operation in which expected gear rack movements actually take place in reaction to actuation of the steering element. In particular, a position of the gear rack, or a change therein, can be determined to determine these movements, wherein the gear rack position can be calculated by means of a rotor bearing sensor in a servomotor for the vehicle wheel actuator.

In some examples, reaction force can be set in the friction-burdened operation, such that it corresponds to the gear rack force, or exhibits a predetermined relationship thereto (e.g., becomes stronger or weaker in relation to the gear rack force by a factor that is a function of speed).

Furthermore, the determination of the gear rack force or the setting of the reaction force based thereon, can take place at any configured times during the friction-burdened operation and in particular during the entire friction-burdened operation, e.g., not only at a transition between the friction-burdened operation and a gear rack movement. This enables a realistic reaction force setting during the entire friction-burdened operation, which is also based on currently present, and not merely previously determined and model-based conditions, because a currently existing actuation force is taken into account.

In some examples, the gear rack force may be set to the actuation force of the vehicle wheel actuator during the friction-burdened operation. In other words, the actuation force of the vehicle wheel actuator during the (e.g., entire) friction-burdened operation may be selected as the gear rack force, and is the basis for the generation of the reaction force. As soon as the gear rack moves, it can be concluded that the friction-burdened operation has ended, and the reaction force can be set according to a known variant, in particular in accordance with a gear rack force that has been determined on the basis of a model.

In some examples, during the friction-burdened operation, the gear rack force may be set to the actuation force for the vehicle wheel actuator. Additionally or alternatively, the actuation force can be predefined by (or as) the actuation value for a regulator. The regulator can be configured as a regulator for the gear rack, for setting gear rack positions to obtain desired steering angles. The regulator can be included in a steering control unit, or it can be implemented as such. The regulator can generate an actuation value that is implemented with the desired actuation force, e.g., by the vehicle wheel actuator.

The regulator can make a target-to-actual comparison, in particular with regard to the gear rack position. The regulator can take into account the position of the steering element, or a value based thereon, which is generated as an actual value. It should be understood that the steering element position or the value based thereon indicates a desired (target) gear rack position, or can be converted to such.

Additionally or alternatively, the actuation value can be an actuation value for a power electronics system for the vehicle wheel actuator that is configured to control an electric (servo)motor for the vehicle wheel actuator to generate the actuation force according to the actuation value. More precisely, the servomotor can generate a torque that is converted to a corresponding actuation force according to a known gear ratio.

In another embodiment, when not in the friction-burdened operation, the gear rack force is determined taking a gear rack position value, and in particular an actual change therein, into account and/or preferably without taking the actuation force into account. This differs from the friction-burdened operation, in which the gear rack force is determined on the basis of the actuation force, and the gear rack position value does not change (and is preferably also not taken into account when determining the gear rack force).

According to another variation, the gear rack position value may be determined using a rotor position sensor for the vehicle wheel actuator. This can take place, for example, when the axle geometry and the gear ratio are known, according to which the rotor position (or the angular value of an output shaft in the servomotor) for the vehicle wheel actuator can be converted to a gear rack position.

The gear rack movement can also be determined indirectly, based on the movement of a component of the vehicle wheel actuator, to determine the friction-burdened operation. By way of example, a change in the rotor position in a servomotor for the vehicle wheel actuator can be detected, and it can then be concluded that the gear rack has moved. Alternatively, a gear rack movement can also be detected or measured using sensors attached to the gear rack. A position of the steering element (and in particular a change therein) can be detected by means of an angular sensor and/or a torque sensor on the steering element.

The present disclosure also relates to a steer-by-wire steering system, that includes, but is not limited to:
 a steering element, by means of which a steering angle can be defined as a function of the steering element position;
 a vehicle wheel actuator, which is configured to set the steering angle when an actuation force is applied thereto, by moving a gear rack in the steering system that is coupled to at least one vehicle wheel;
 a reaction force actuator, with which a reaction force can be generated on the steering element in accordance with a gear rack force; and
 a determination device that is configured to:
  determine a friction-burdened operation in which the gear rack does not move when the steering element position is altered;
 and when in the friction-burdened operation:
  determine the gear rack force on the basis of the actuation force of the vehicle wheel actuator.

All of the explanations, developments, and features given above and below that relate to features of the method that have the same names can also be applied to the steering system. In particular, the steering system can be configured to execute a method according to any of the aspects described above and below.

The determination device can be included in at least one steering control unit, or it can be implemented as such, or by numerous control units. In particular, it can be connected to a rotor position sensor in a servomotor for the vehicle wheel actuator, in order to determine that the gear rack has moved. It can also be connected to a sensor in the steering element, in particular an angle and/or torque sensor, e.g., to determine changes in the position of the steering element. The latter can also be determined indirectly, simply based on changes in any torque signals.

Moreover, the present disclosure relates to a vehicle, comprising a steering system according to any of the above aspects.

BRIEF DESCRIPTION OF THE DRAWINGS

Aspects of the present disclosure shall be explained below in reference to the drawings. Therein.

DETAILED DESCRIPTION

Figure 1:
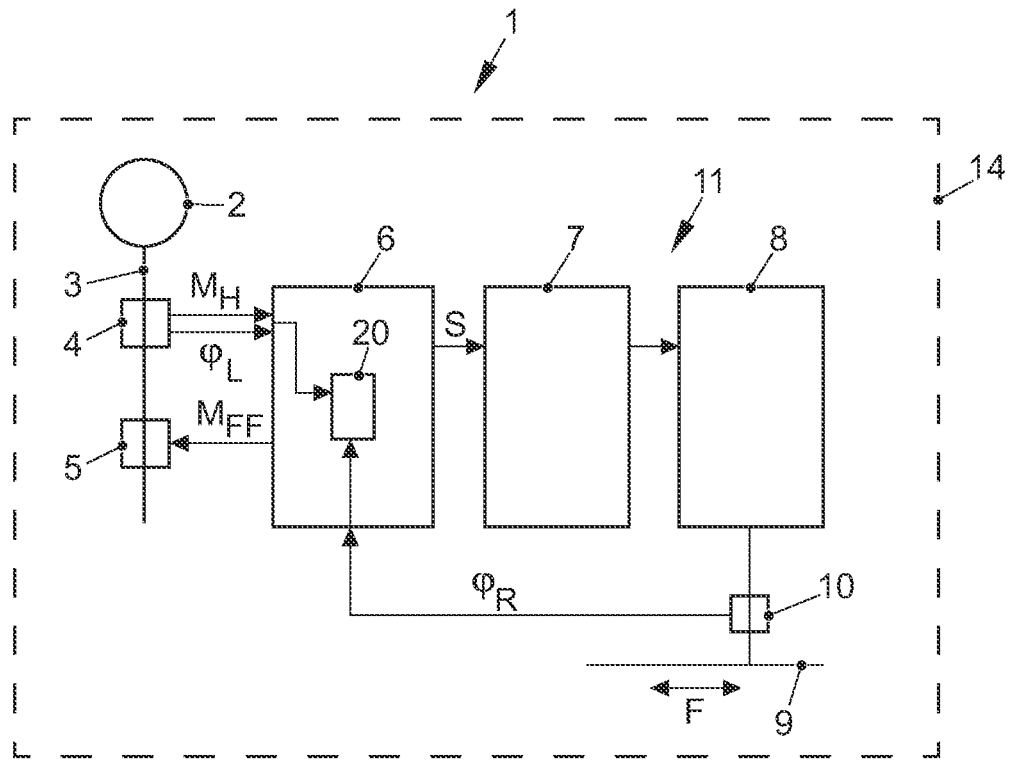
FIG. 1 shows a schematic drawing illustrating the principles of a steering system according to an exemplary embodiment of the present disclosure.

A (steer-by-wire) steering system 1 according to an exemplary embodiment is shown in FIG. 1 as a schematic drawing illustrating the principles of the present disclosure. The steering system 1 is part of a vehicle 14, indicated by a broken line.

In this example, the steering system 1 includes a steering element 2 in the form of a steering wheel, which is connected to an input shaft 3. There is a torque sensor 4 on the input shaft 3 for detecting a manual steering torque $M_H$ exerted by the driver, and a reaction force actuator 5 for generating a feedback torque $M_{FF}$ applied to the steering element 2, corresponding to the generation of a reaction force, or resulting in a corresponding reaction force, and which can be converted into such. The conversion of the feedback torque $M_{FF}$ and reaction force can take place taking the size or leverage of the feedback actuator 5, input shaft 3, and/or steering element 2 into account.

In addition, an angular position (i.e., setting) $\varphi_L$ of the steering element 2 can be determined, for example, with the torque sensor 4 or a separate sensor (not shown), e.g. a rotor position sensor in the reaction force actuator 5. Using this angular position $\varphi_L$ and/or the manual steering torque $M_H$, as well as their changes, in particular, it is possible to determine whether or not the position of the steering element 2 has changed.

The steer-by-wire steering system 1 may also include a control unit in the form of a steering control unit 6 and a vehicle wheel actuator 11, comprising a power electronics system 7 and an electric servomotor 8, which is connected to a gear rack 9, e.g., via a spherical head or sprocket gearing. The electric servomotor 8 may be configured with a rotor position sensor 10, from which rotor angle signals $\varphi_R$ can be converted back to the gear rack position.

A steering angle may be determined in the steering control unit 6 based on the manual steering torque $M_H$ and other input variables, e.g., the motor vehicle speed, as the target value, in a manner known per se, which is to be set on the vehicle wheels by the vehicle wheel actuator 11 or its servomotor 8 via the gear rack 9. For this, the steering control unit 6 generates an actuation value, or an actuation signal S for the power electronics system 7. The actuation value S can also be referred to as a gear rack position specification, wherein the desired steering angle is set via the corresponding predefined gear rack position. The rotor angle signal $\varphi_R$ can be used as the actual signal for determining the actuation value S (e.g., by converting it to an actual gear rack position). The steering control unit 6 therefore serves as a regulator for the gear rack position and the (vehicle wheel) steering angle set therewith.

The actuation value S can also be converted to a torque exerted by the servomotor and an actuation force F acting on the gear rack 9 (e.g., resulting from a gear ratio in the spherical head gearing). This conversion can likewise be carried out by the steering control unit 6, and used to set the feedback torque $M_{FF}$ when a friction-burdened operation has been detected.

A friction-burdened operation is preferably detected by the determination device 20 in the steering control unit 6. The determination device 20 may evaluate the rotor angle signal $\varphi_R$ and the torque and/or angular position signals $M_H$, $\varphi_L$ associated with the steering element 2. In particular, the determination device 20 checks the relationships of these signals to one another, e.g., with regard to whether changes in the torque and/or angular position signals $M_H$, $\varphi_L$, which indicate changes in the position of the steering element, agree with the expected changes in the rotor angle signal $\varphi_R$. The latter corresponds to a change in the gear rack position, and therefore a movement of the gear rack.

If instead, none of these changes are detected, and in particular, the position of the steering element is changed, without resulting in a change in the rotor angle signal $\varphi_R$, the determination device 20 determines a friction-burdened operation. In this case, it can be assumed that actuation forces F generated by the servomotor 8 dissipate entirely through internal friction, such that the gear rack does not move. A friction-burdened operation also includes scenarios in which a predefined steering movement is not implemented, e.g. because the vehicle wheels are blocked (e.g. by a curb), and the gear rack does not move.

The present disclosure exploits this in that the actuation forces F of the servomotor 8 generated in the friction-burdened operation are used to set an appropriate feedback torque $M_{FF}$ at the steering element 2. This is based on the idea that these actuation forces F in the friction-burdened operation correspond to the currently active gear rack force. Even if the gear rack does not move, and there is significant internal friction, the driver can still be given a realistic feedback through the steering element 2. This improves the operability of the steering system 1 from the perspective of the driver.

In normal operation, distinguished by the absence of a friction-burdened operation, and changes in the position of the steering element result in expected movements of the gear rack 9, a feedback torque $M_{FF}$ may be determined by the steering control unit 6 on the basis of the current rotor angle signal $\varphi_R$ and/or a change therein. In particular, the presence of a gear rack force can be assumed in the manner known per se using a model, and a value for the feedback torque $M_{FF}$ can be determined on the basis of this gear rack force. In the friction-burdened operation described above, this is difficult utilizing the prior art, or can only be achieved imprecisely, because the rotor angle signal $\varphi_R$ remains unchanged, despite the manual steering torque $M_H$ that has been generated. In other words, the gear rack force and/or reaction force are determined differently in normal operation than in the friction-burdened operation.

Figure 2:
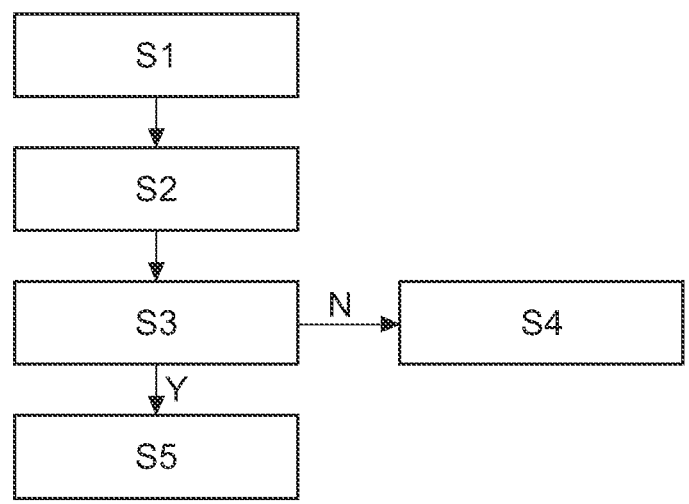
FIG. 2 shows a flow chart for a method according to the present disclosure, which can be executed by the steering system in FIG. 1.

A flow chart for a method according to the present disclosure is shown in FIG. 2, which can be executed with the steering system 1 shown in FIG. 1. (Any) changes in the position of the steering element are determined in step S1. This can take place, for example, based on the signals $M_H$, $\varphi_L$ explained above. (Any) movement of the gear rack is determined in step S2. This can be determined, for example, based on changes in the rotor angle signal $\varphi_R$.

A friction-burdened operation is determined in step S3, for which any changes or movements determined in steps S1 and S2 in the manner described above are compared. If a friction-burdened operation is determined (arrow N), a typical setting of the feedback torque $M_{FF}$ takes place in step S4, e.g., based on a model-based determined gear rack force, in which the actuation force F of the servomotor 8 is less strong, or can also remain unaccounted for. In particular in this case, it cannot be assumed from the relationships in the friction-burdened operation that further force components, e.g., counterforces when redirecting the vehicle wheels, arise and can affect the gear rack force.

If a friction-burdened operation is determined (arrow Y), the feedback torque $M_{FF}$ is determined in step S5 based on the current gear rack force, which is set to the actuation force F.

LIST OF REFERENCE SYMBOLS

1 steering system
2 steering element
3 input shaft
4 torque sensor
5 reaction force actuator
6 steering control unit/regulator
7 power electronics system
8 servomotor
9 gear rack
10 rotor position sensor
11 vehicle wheel actuator
14 vehicle
20 determination device
$M_H$ manual steering torque
$\varphi_R$ rotor angle signal
$\varphi_L$ angular position

The invention claimed is:

1. A system for determining a gear rack force in a steer-by-wire steering system, comprising:
   a steering element, configured to specify a steering angle as a function of a position of the steering element;
   a vehicle wheel actuator, configured to set the steering angle by moving a gear rack in the steering system coupled to at least one vehicle wheel by applying an actuation force thereto;
   a reaction force actuator, for generating a reaction force on the steering element in accordance with a gear rack force;
   a steering control unit, configured to
      determine that a friction-burdened operation is present from the steering element, in which the gear rack does not move when the position of the steering element is changed,
      determine a new gear rack force for the friction-burdened operation, based on the actuation force of the vehicle wheel actuator, and
      generating a feedback torque to the steering element.

2. The system of claim 1, wherein the steering control unit is configured to determine the new gear rack force using the actuation force of the vehicle wheel actuator when the friction-burdened operation is determined.

3. The system of claim 1, wherein the steering control unit is configured to define the actuation force by the actuation value of a regulator.

4. The system of claim 3, wherein the regulator is configured to detect one of (i) a position of the steering element, or (ii) a value generated on the basis thereof, as a target value.

5. The system of claim 3, wherein the regulator is further configured to detect one of (i) a position of the gear rack, or (ii) a value generated on the basis thereof, as an actuation value.

6. The system of claim 5, wherein the actuation value comprises an actuation value for a power electronics system in the vehicle wheel actuator that is configured to control an electric motor in the vehicle wheel actuator for generating the actuation force in accordance with the actuation value.

7. The system of claim 5, wherein, if the steering control unit determines that the friction-burdened operation is not present, the new gear rack force is determined using a gear rack position value.

8. The system of claim 7, wherein the gear rack position value is determined using a rotor position sensor in the vehicle wheel actuator.

9. The system of claim 1, the movement of the gear rack is determined by a movement of a component in the vehicle wheel actuator.

10. A method for operating a steer-by-wire steering system, comprising:
   specifying, via a steering element, a steering angle as a function of a position of the steering element;
   setting, via a vehicle wheel actuator, the steering angle by moving a gear rack in the steering system coupled to at least one vehicle wheel by applying an actuation force thereto;
   generating, via a reaction force actuator, a reaction force on the steering element in accordance with a gear rack force;
   determining, via a steering control unit, that a friction-burdened operation is present from the steering element, in which the gear rack does not move when the position of the steering element is changed,
   determining, via the steering control unit, a new gear rack force for the friction-burdened operation, based on the actuation force of the vehicle wheel actuator, and
   generating, via the steering control unit, a feedback torque to the steering element.

11. The method of claim 10, wherein determining the new gear rack force comprises using the actuation force of the vehicle wheel actuator when the friction-burdened operation is determined.

12. The method of claim 10, further comprising defining, via the steering control unit, the actuation force by the actuation value of a regulator.

13. The method of claim 12, wherein defining the actuation force comprises detecting one of (i) a position of the steering element, or (ii) a value generated on the basis thereof, as a target value.

14. The method of claim 12, wherein defining the actuation force comprises detecting one of (i) a position of the gear rack, or (ii) a value generated on the basis thereof, as an actuation value.

15. The method of claim 14, wherein the actuation value comprises an actuation value for a power electronics system in the vehicle wheel actuator that is configured to control an electric motor in the vehicle wheel actuator for generating the actuation force in accordance with the actuation value.

16. The method of claim 14, wherein, if the determining establishes that the friction-burdened operation is not present, the new gear rack force is determined using a gear rack position value.

17. The method of claim 16, wherein the gear rack position value is determined using a rotor position sensor in the vehicle wheel actuator.

18. The method of claim 10, wherein the movement of the gear rack is determined by a movement of a component in the vehicle wheel actuator.

19. A system for determining a gear rack force in a steer-by-wire steering system, comprising:
- a steering element, configured to specify a steering angle as a function of a position of the steering element;
- a vehicle wheel actuator, configured to set the steering angle by moving a gear rack in the steering system coupled to at least one vehicle wheel by applying an actuation force thereto;
- a reaction force actuator, for generating a reaction force on the steering element in accordance with a gear rack force;
- a steering control unit, configured to
  - define the actuation force by the actuation value of a regulator
  - determine that a friction-burdened operation is present from the steering element, in which the gear rack does not move when the position of the steering element is changed,
  - determine a new gear rack force for the friction-burdened operation, based on the actuation force of the vehicle wheel actuator, and
  - generating a feedback torque to the steering element.

20. The system of claim 19, wherein the regulator is configured to detect one of (i) a position of the steering element, or (ii) a value generated on the basis thereof, as a target value, and wherein the regulator is further configured to detect one of (a) a position of the gear rack, or (b) a value generated on the basis thereof, as an actuation value.

* * * * *